US012650090B2

(12) United States Patent
Kofler et al.

(10) Patent No.: US 12,650,090 B2
(45) Date of Patent: Jun. 9, 2026

(54) HOUSING COMPONENT FOR A PRECHAMBER COMPONENT OF A COMBUSTION ENGINE

(71) Applicant: INNIO Jenbacher GmbH & Co OG, Jenbach (AT)

(72) Inventors: Michael Kofler, Weerberg (AT); Thomas Ullrich, Vomperbach (AT); Thomas Fankhauser, Finkenberg (AT); Lukas David Zahner, Rosenheim (DE)

(73) Assignee: Innio Jenbacher GmbH & Co OG, Jenbach (AT)

( * ) Notice: Subject to any disclaimer, the term of this patent is extended or adjusted under 35 U.S.C. 154(b) by 137 days.

(21) Appl. No.: 18/603,152

(22) Filed: Mar. 12, 2024

(65) Prior Publication Data

US 2024/0309800 A1 Sep. 19, 2024

(30) Foreign Application Priority Data

Mar. 13, 2023 (DE) ........................ 102023106127.5

(51) Int. Cl.
*F02B 19/12* (2006.01)
*F02B 19/18* (2006.01)

(52) U.S. Cl.
CPC .............. *F02B 19/12* (2013.01); *F02B 19/18* (2013.01)

(58) Field of Classification Search
CPC ...... F02B 19/12; F02B 19/18; F02B 19/1004; F02B 19/16
See application file for complete search history.

(56) References Cited

U.S. PATENT DOCUMENTS

| | | | | |
|---|---|---|---|---|
| 5,222,993 | A | 6/1993 | Crane | |
| 11,085,402 | B1 * | 8/2021 | Vroman | F02M 23/04 |
| 2013/0139784 | A1 * | 6/2013 | Pierz | F02B 19/16 123/254 |
| 2020/0080508 | A1 * | 3/2020 | Rabhi | F02B 19/1071 |
| 2021/0254543 | A1 * | 8/2021 | Rabhi | F02B 19/02 |
| 2023/0103567 | A1 * | 4/2023 | Hageneder | H01T 13/54 123/293 |

FOREIGN PATENT DOCUMENTS

| | | | |
|---|---|---|---|
| AU | 2020276402 | A1 | 12/2021 |
| CN | 104040138 | A | 9/2014 |
| DE | 102019111091 | A1 | 7/2020 |

(Continued)

OTHER PUBLICATIONS

German Office Action of DE Application No. 102023106127.5, dated Nov. 14, 2023; 9 pages.

(Continued)

*Primary Examiner* — Xiao En Mo
(74) *Attorney, Agent, or Firm* — Fletcher Yoder, P.C.

(57) ABSTRACT

A prechamber assembly for a combustion engine includes a prechamber component having one or more transfer ports, and a housing component having an igniter housing area. The prechamber component and the housing component are coupled together to at least partially define a prechamber. The housing component includes a first portion having a first material, and a second portion having a second material different from the first material, wherein the second portion is between the prechamber and the first portion.

20 Claims, 2 Drawing Sheets

(56) References Cited

FOREIGN PATENT DOCUMENTS

| | | | |
|---|---|---|---|
| DE | 102020110395 | A1 | 10/2021 |
| EP | 1091104 | A1 | 4/2001 |
| EP | 2539563 | A1 | 1/2013 |

OTHER PUBLICATIONS

European Search Report of EP Application No. 24 16 1468 dated Aug. 6, 2024, 4 pages.

Canadian Office Action of CA Application No. 3,231,764 dated Jul. 4, 2025, 5 pages.

* cited by examiner

HOUSING COMPONENT FOR A PRECHAMBER COMPONENT OF A COMBUSTION ENGINE

CROSS-REFERENCE TO RELATED APPLICATION

This application claims priority to and benefit of German Application No. DE102023106127.5, filed on Mar. 13, 2023, entitled "HOUSING COMPONENT FOR A PRECHAMBER COMPONENT OF A COMBUSTION ENGINE", which is herein incorporated by reference in its entirety.

BACKGROUND

The present invention relates to a housing component for a prechamber component of a combustion engine, an assembly of such a housing component with a prechamber component, and a combustion engine with such a housing component.

Generic housing components for prechamber components of a combustion engine comprise a prechamber component housing area, which prechamber component housing area is formed to house the prechamber component surrounding and/or forming at least a large portion of a prechamber of the combustion engine, and at least one ignition means housing area, which at least one ignition means housing area is formed to house an ignition means—an igniter, preferably a spark plug—and to orient it in the direction of the prechamber component housing area.

It is known from the state of the art to insert corresponding housing components, for example, into cylinder heads of a combustion engine, which serve to house an ignition means on the one hand and to house the component forming the prechamber on the other hand.

As a rule, these housing components are made of a steel material and positioned in the cylinder head, such that they can divert the heat introduced via the prechamber and the ignition means into the housing component directly to the surrounding cylinder head.

Designs in which a coolant, for example cooling water, flows directly around the housing component in order for it to be actively cooled, are also known.

Consequently, a requirement of the housing component arises that the housing component implements the heat conductivity and/or the ability to transport high thermal energies.

Accordingly, it is also known to provide housing components with the best possible heat conductivity in a targeted manner through the choice of material, wherein, for example, embodiments of housing components made of copper are known, which however have not become widespread due to the much higher material prices compared with embodiments made of steel alloys.

Consequently, there is a desire arising from the state of the art for a housing component by which the heat removal of heat energies produced in a prechamber or by a spark plug can be improved and/or which still represents a cost-saving and/or resource-saving embodiment variant.

BRIEF DESCRIPTION

This desire is achieved in the course of embodiments of the present invention by a housing component with the features set forth in the claims, an assembly of a corresponding housing component with a prechamber component with the features of set forth in the claims, and a combustion chamber with the features of set forth in the claims.

According to embodiments of the invention, it is provided that a housing component for a prechamber component of a combustion engine comprises the following:

a prechamber component housing area, which prechamber component housing area is formed to house the prechamber component surrounding and/or forming at least a large portion of a prechamber of the combustion engine, and at least one ignition means housing area, which at least one ignition means housing area is formed to house an ignition means—an igniter, preferably a spark plug—and to orient it in the direction of the prechamber component housing area, wherein the housing component consists of a first material in a first area and of a second material differing from the first material in a second area, wherein the second area at least partly contains the prechamber component housing area.

By designing the housing component using two different materials, the possibility is created that, using specific areas of a single housing component, different requirements can be catered for in the respective area of the housing component.

Thus, in a second area, which at least partly contains the prechamber component housing area, the increased requirements in respect of the heat conductivity can be catered for and this area can be formed by a material which has corresponding properties, whereas a further (first) area of the housing component, which is subject to lower thermal influences, can be formed by a material which has lower thermal conductivity properties, whereby resources can be saved in a cost-effective way.

Consequently, according to certain embodiments of the invention, a housing component can be provided in resource-saving manner, wherein rare and sought-after materials with corresponding properties, which are often associated with costly and energy-intensive production processes, can be used sparingly.

In summary, embodiments of the present invention thus enable a housing component to be provided which, with increased thermal properties in respect of the heat removal, still allows for an economical and ecological production.

It can also be provided that embodiments of the invention are used in systems that are already known in the state of the art and corresponding combustion engines (such as, for example, described in the introduction to the description) and is preferably installed subsequently.

Combustion engines—in particular stationary combustion engines—can be used to drive generators for power generation. Such designs are often called gensets.

Combustion engines can be described as thermal working machines in which energy released as heat by combustion is converted into mechanical work, such as, for example, in Otto engines, in particular gas engines, diesel engines, or the like.

Advantageous embodiments of the invention are defined in the dependent claims.

It can preferably be provided that the first material is implemented by a steel alloy and/or the second material is implemented by a copper alloy. It can be provided that the second material is implemented by a copper alloy in which copper forms the main constituent of the alloy.

A further positive effect in the provision of the second material as copper alloy was shown in the sealing of the prechamber component against the housing component, as better sealing properties can be achieved as a result of the soft properties—for example compared with steel—of a copper alloy in the prechamber component housing area when it is joined to the prechamber component, even without the provision of separate sealing elements.

It can be provided that the first area contains the at least one ignition means housing area and/or at least partly surrounds the ignition means in a housed state of the ignition means.

It can preferably be provided that the housing component has at least one supply pipe, which at least one supply pipe is formed to supply the prechamber and/or the prechamber component with a fuel, air or a fuel-air mixture, in particular which at least one supply pipe is arranged at least partly—for example fully—in the second area.

It can be provided that the housing component has at least one prechamber gas valve sleeve housing to house a prechamber gas valve, which prechamber gas valve sleeve housing is connected, for example, to the at least one supply pipe.

It can preferably be provided that the at least one prechamber gas valve sleeve housing is formed to house the prechamber gas valve, wherein the at least one supply pipe branches off directly from the at least one prechamber gas valve sleeve housing, and the at least one supply pipe is formed to supply fuel, air or a fuel-air mixture provided in the prechamber gas valve positioned in the at least one prechamber gas valve sleeve housing to the prechamber component housing area, via which the fuel, the air or the fuel-air mixture can be supplied to a prechamber.

It can be provided that the housing component with the prechamber component housing area is formed, together with the prechamber component, to delimit and thus form the prechamber of the combustion engine.

It can preferably be provided that the at least one ignition means housing area connects an area for housing the ignition means to the prechamber component housing area and is formed such that the ignition means can be arranged substantially in the area for housing the ignition means, with the result that an ignition area of the ignition means is oriented through the at least one ignition means housing area towards the prechamber component housing area in order to be able to carry out an ignition in the prechamber.

It can be provided that the housing component has an outer wall with a substantially cylindrical basic shape, which is formed to be inserted into a cylinder head of the combustion engine.

It can preferably be provided that the housing component has a sleeve-shaped basic structure which surrounds the prechamber component housing area and the at least one ignition means housing area.

It can be provided that the at least one ignition means housing area connects the prechamber component housing area, preferably formed sleeve-shaped, of the housing component to an area, preferably formed sleeve-shaped and at least partly surrounding the ignition means in a housed state of the ignition means, of the housing component.

It can preferably be provided that the first area and the second area are formed by two components which are joined in a material-bonding manner via a joining method—preferably a friction welding method—to form the housing component. Material-bonding methods, such as, for example, other welding methods or soldering methods, in particular brazing methods, are also entirely conceivable.

Protection is furthermore sought for an assembly of a prechamber component and a housing component according to embodiments of the invention, wherein the prechamber component is joined, preferably welded, to the housing component via the prechamber component housing area of the housing component, wherein a prechamber of the combustion engine is at least partly formed by the housing component and the prechamber component.

The prechamber component can be formed cupped, wherein the opening is closed off by the prechamber component housing area of the housing component.

It can preferably be provided that the prechamber component has at least one, preferably a plurality of, overflow openings which connect the prechamber to the prechamber environment (to a combustion space of the combustion engine in the installed state of the prechamber in the combustion engine).

It can be provided that an ignition means, in particular an igniter, such as a spark plug, is arranged in at least one ignition means housing area, preferably wherein an ignition area of the ignition means projects through the at least one ignition means housing area of the housing component into the prechamber.

Protection is furthermore sought for a combustion engine, in particular a gas-powered piston engine with a housing component according to embodiments of the invention and/or an assembly of a prechamber component with a housing component according to embodiments of the invention.

BRIEF DESCRIPTION OF THE DRAWINGS

Further advantages and details of the invention are revealed by the figures and the associated description of the figures. There are shown in.

DETAILED DESCRIPTION

Figure 1:
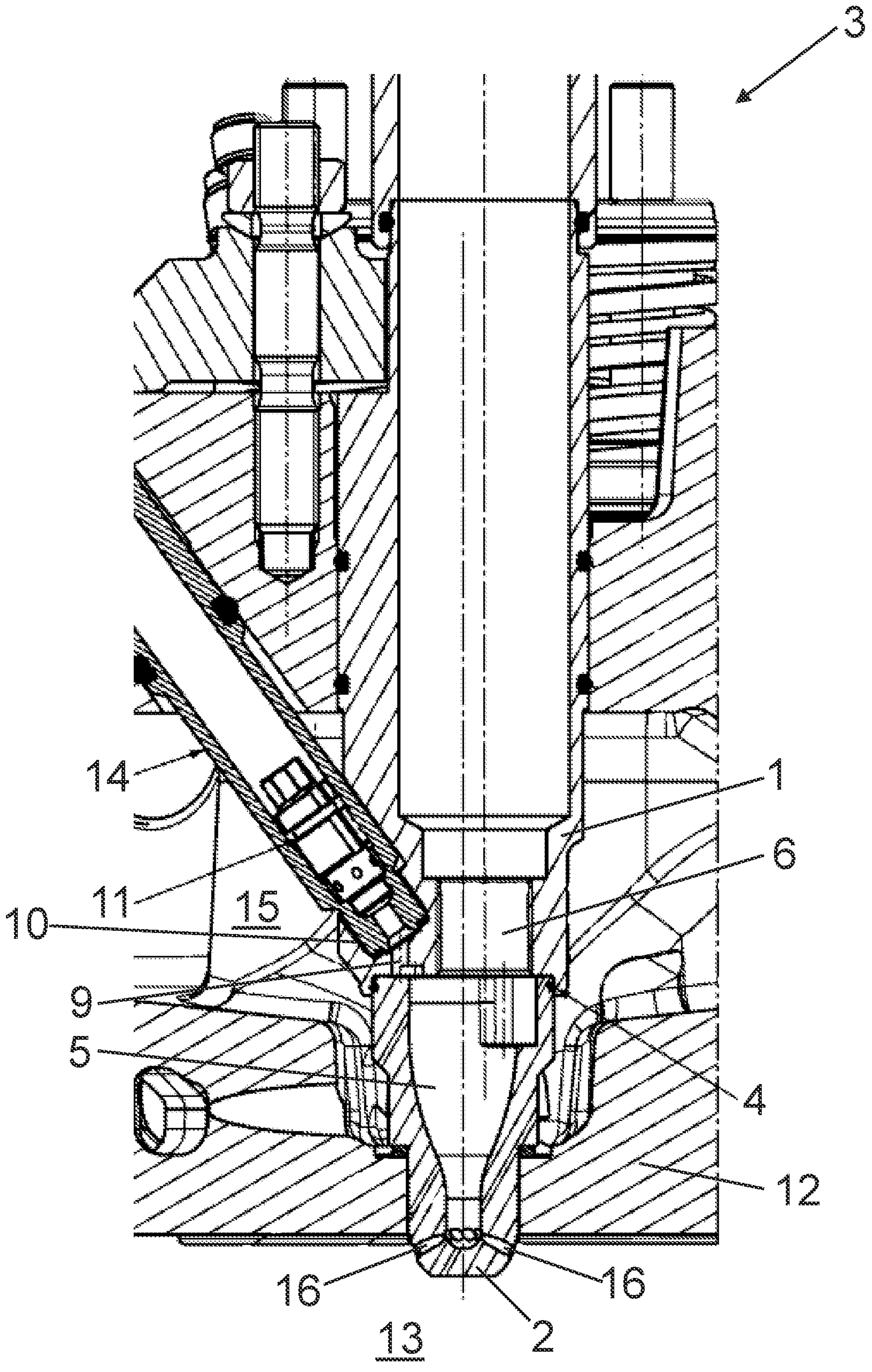
FIG. 1 illustrates an installation position of a housing component in a cylinder head of a combustion engine.

FIG. 1 shows an installation position of a housing component 1 in a cylinder head 12 of a combustion engine 3.

The housing component 1 with its cylindrical basic structure is inserted into a corresponding opening of the cylinder head 12 of the combustion engine 3.

Fitted in a prechamber component housing area 4 of the housing component 1 is the prechamber component 2, which the housing component 1 supports against the cylinder head 12 in the direction of a combustion space 13 (combustion chamber).

The housing component 1 furthermore has an ignition means housing area 6, which is formed as a threaded area.

In this ignition means housing area 6, an ignition means—an igniter, such as a spark plug in this embodiment example—can be inserted which projects through the ignition means housing area 6 into a prechamber 5 (combustion chamber).

The prechamber 5 is surrounded and thus formed by the prechamber component 2 and the housing component 1 in the area of the prechamber component housing area 4.

The housing component 1 furthermore has a prechamber gas valve sleeve housing 10 in which the prechamber gas valve 11 is arranged via the prechamber gas valve sleeve 14.

A coolant can flow via a cooling channel 15 of the cylinder head 12 around the housing component 1, the prechamber component 2, and the prechamber gas valve sleeve 14 and the prechamber gas valve 11, whereby an active cooling of these components can be carried out.

In order to seal the cooling channel 15 against the environment, the respective components are sealed against the cylinder head 12 by means of seals formed individually as o-rings.

During operation of the combustion engine 3, air, fuel or an air-fuel mixture is supplied to the prechamber 5 via the prechamber gas valve 11 and a supply pipe 9 of the housing component 1, which is subsequently ignited via an ignition means arranged in the ignition means housing area 6 and combusts in the prechamber 5.

Through the combustion in the prechamber 5 (in particular the expansion produced by the combustion), so-called ignition torches are passed via transfer ports 16 of the prechamber component 2 into the combustion space 13 of the combustion engine 3 which initiate the combustion in the combustion space 13.

Corresponding prechamber concepts for combustion engines 3 are used as "ignition amplifiers" by the state of the art. Corresponding ignition amplifiers are used primarily in combustion engines with large combustion spaces (from approx. 2.5 litres).

Figure 2:
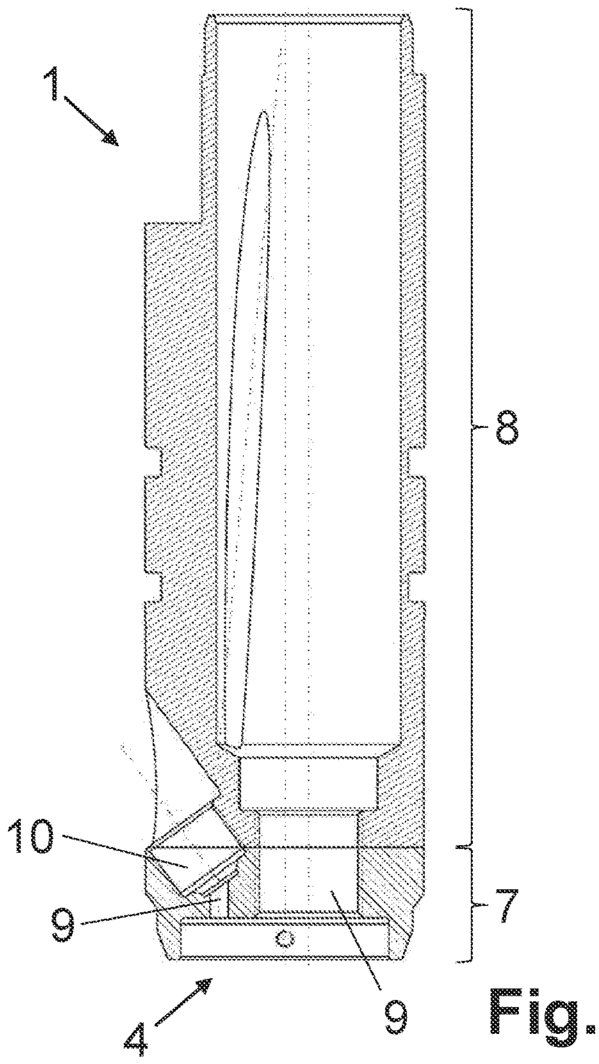
FIGS. 2 to 4 illustrate a housing component according to a first embodiment example of the invention.
Figure 3:
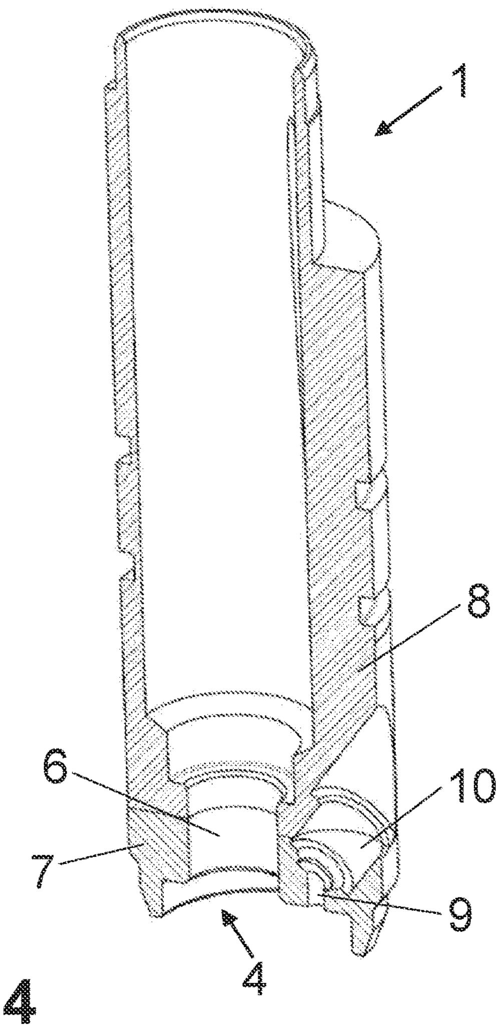
Figure 4:
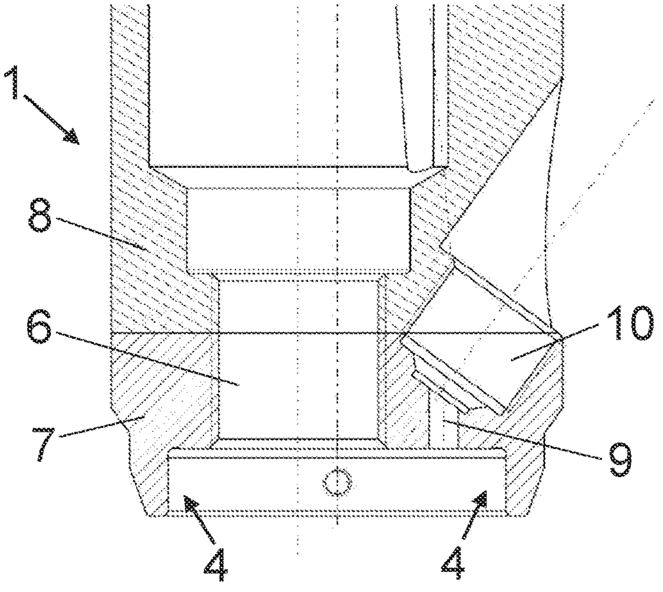

FIGS. 2 to 4 show an embodiment example of a housing component 1 according to a first embodiment example of the invention, wherein FIG. 2 represents a section along the longitudinal axis and FIG. 3 a perspective view of FIG. 2.

FIG. 4 represents a detail view of the end, facing the combustion space 13, of the housing component 1 in an installed state of the housing component 1 in the combustion engine 3.

The housing component 1 of the embodiment example of FIGS. 2 to 4 has a prechamber component housing area 4, which prechamber component housing area 4 is formed to house the prechamber component 2.

This prechamber component housing area 4, together with the prechamber component 2, at least partly forms the prechamber 5.

The prechamber component housing area 4 is connected to the prechamber gas valve sleeve housing 10 of the housing component 1 via the supply pipe 9 of the housing component 1.

By means of the prechamber gas valve sleeve housing 10, a prechamber gas valve 11 can be housed via which air, fuel or an air-fuel mixture can be supplied to the prechamber 5 via the supply pipe 9.

Furthermore, the housing component 1 of this embodiment example has an ignition means housing area 6, which ignition means housing area 6 is formed to house an ignition means—a spark plug in this embodiment example—and to orient it in the direction of the prechamber component housing area 4.

In other words, a spark plug is screwed into the ignition means housing area 6 formed as a thread, with the result that the spark plug projects through the ignition means housing area 6 into the prechamber 5 and thus the electrodes of the spark plug are positioned in the prechamber 5, while the prechamber 5 and the prechamber component housing area 4 are sealed to the top via the spark plug itself.

In an end, facing away from the combustion space 13, of the housing component 1, the ignition means—the spark plug—is enclosed in rotatory manner by the housing component.

In this embodiment example, the housing component 1 is formed by a first area 7 and a second area 8, which are represented by different hatchings for reasons of clarity, even though these areas 7, 8 are part of a single, joint component, the housing component 1.

The first area 7 of this embodiment example contains the prechamber component housing area 4, the supply pipe 9, part of the ignition means housing area 6 and likewise part of the prechamber gas valve sleeve housing 10.

This first area 7 of this embodiment example is formed by a first material which is implemented by a copper alloy.

This copper alloy has increased heat conductivity properties, with the result that these components of the housing component 1, subject to high heat stresses during combustion, can, as a result of the improved heat conductivity, divert the heat energy to the surrounding cylinder head 12 and/or the coolant supplied to the housing component 1.

The second area 8 is formed by a second material, which is different to the first material. In this embodiment example, the second area 8 is implemented by a steel alloy.

For manufacture, the first area 7 and the second area 8 are implemented by two separate components, which are joined together by means of a friction welding method during the manufacturing process to form the housing component 1.

LIST OF REFERENCE NUMBERS

1 housing component
2 prechamber component
3 combustion engine
4 prechamber component housing area
5 prechamber
6 ignition means housing area
7 first area
8 second area
9 supply pipe
10 prechamber gas valve sleeve housing
11 prechamber gas valve
12 cylinder head
13 combustion space
14 prechamber gas valve sleeve
15 cooling channel
16 transfer port

The invention claimed is:

1. A system, comprising:

a housing component for a prechamber component of a combustion engine, comprising:

a prechamber component housing area, wherein the prechamber component housing area is formed to house the prechamber component surrounding and/or forming at least a portion of a prechamber of the combustion engine, and at least one igniter housing area, wherein the at least one igniter housing area is formed to house and orient an igniter in a direction of the prechamber component housing area, wherein the housing component consists of a first material in a first area and of a second material differing from the first material in a second area, wherein the first area at least partly contains the prechamber component housing area, and the second area is at least partially axially offset from the first area relative to a central axis of the housing component.

2. The system of claim 1, wherein the second material comprises a steel alloy and the first material comprises a copper alloy.

3. The system of claim 1, wherein the housing component comprises a first passage extending from an exterior of the housing component to the prechamber component housing area, the first passage comprises the at least one igniter housing area configured to couple the igniter in the first passage, and the first passage extends through at least the first area.

4. The system of claim 3, wherein the first passage extends through both the first area and the second area.

5. The system of claim 3, wherein the housing component comprises a second passage extending from the exterior of the housing component to the prechamber component housing area, the second passage is configured to supply at least a fuel into the prechamber, and the second passage extends through at least the first area.

6. The system of claim 5, wherein the second passage extends through both the first area and the second area.

7. The system of claim 6, wherein the first passage extends through both the first area and the second area.

8. The system of claim 1, wherein the housing component has an outer wall with a substantially cylindrical shape configured to insert into a cylinder head of the combustion engine, the first area comprises a first portion of the substantially cylindrical shape extending to a first axial end of the housing component, and the second area comprises a second portion of the substantially cylindrical shape extending to a second axial end of the housing component opposite from the first axial end.

9. The system of claim 1, wherein the prechamber component housing area comprises a first surface configured to contact a second surface of the prechamber component over an axial distance relative to the central axis, and the first and second surfaces extend circumferentially about the central axis.

10. The system of claim 1, wherein the first area defines an axial end of the prechamber relative to the central axis, and the second area is offset from the axial end of the prechamber by an axial offset distance relative to the central axis.

11. The system of claim 1, wherein the first area and the second area are formed by two components coupled together along a joint, and the joint is axially between the first area and the second area relative to the central axis.

12. The system of claim 1, comprising the prechamber component and the housing component, wherein a prechamber of the combustion engine is at least partly formed by the housing component and the prechamber component.

13. The system of claim 12, comprising the igniter coupled to threads of the at least one igniter housing area, wherein an ignition area of the igniter projects through the at least one igniter housing area of the housing component into the prechamber, the igniter comprises a spark plug, and the threads are disposed in at least one of the first area or the second area.

14. The system of claim 1, comprising the combustion engine having the prechamber component with the housing component.

15. A system, comprising:
- a prechamber assembly for a combustion engine, wherein the prechamber assembly comprises:
  - a prechamber component comprising one or more transfer ports; and
  - a housing component comprising an igniter housing area, wherein the prechamber component and the housing component are coupled together to at least partially define a prechamber, wherein the housing component comprises:
    - a first portion comprising a first material; and
    - a second portion comprising a second material different from the first material, wherein the first portion is axially between the prechamber and the second portion relative to a central axis of the housing component.

16. The system of claim 15, wherein the first material has a greater heat conductivity than the second material.

17. The system of claim 16, wherein the first material comprises a copper alloy.

18. A system, comprising:
- a housing component configured to couple to a prechamber component to at least partially define a prechamber of a combustion engine, wherein the prechamber component comprises one or more transfer ports, the housing component comprises an igniter housing area, and the housing component comprises:
  - a first portion comprising a first material; and
  - a second portion comprising a second material different from the first material, wherein the first portion is axially between the prechamber and the second portion relative to a central axis of the housing component.

19. The system of claim 18, wherein the first material has a greater heat conductivity than the second material.

20. The system of claim 19, wherein the first material comprises a copper alloy.

* * * * *